Feb. 13, 1968   W. J. CONOVER   3,368,527
POULTRY RAISING AND LAYING HOUSE
Filed April 11, 1966   5 Sheets-Sheet 1
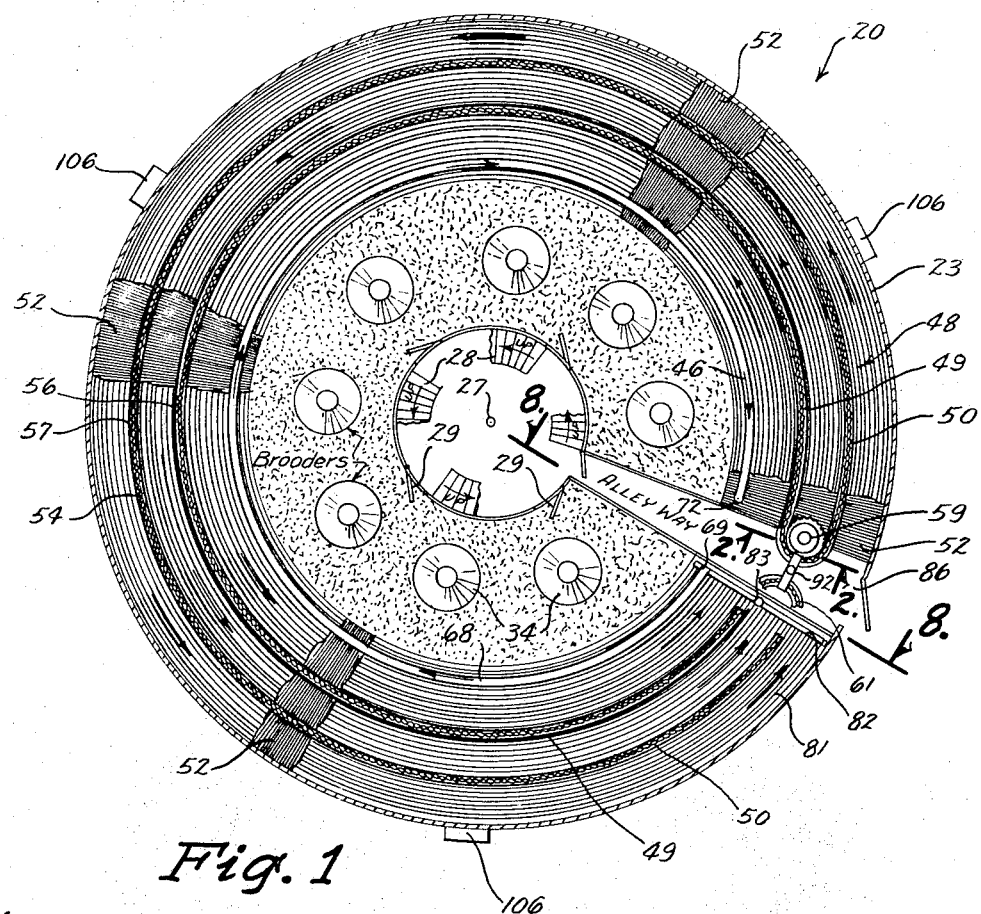
Fig. 1
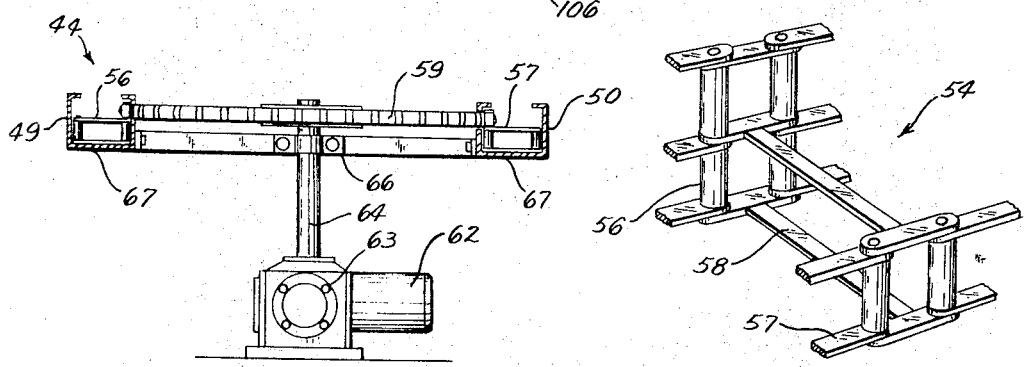
Fig. 2
Fig. 3
INVENTOR
WILLIAM J. CONOVER
BY
R. Robert Henderson
ATTORNEY

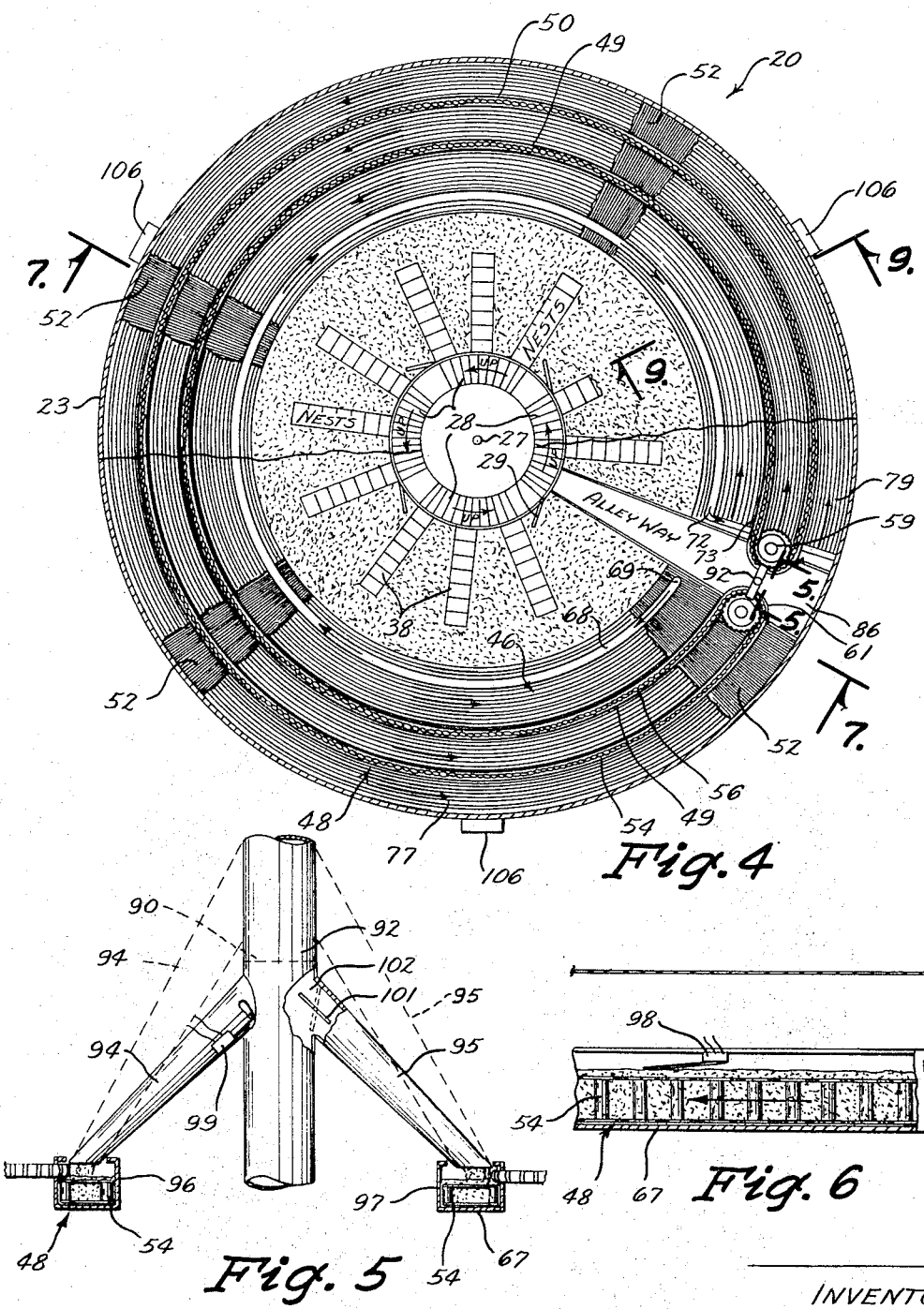

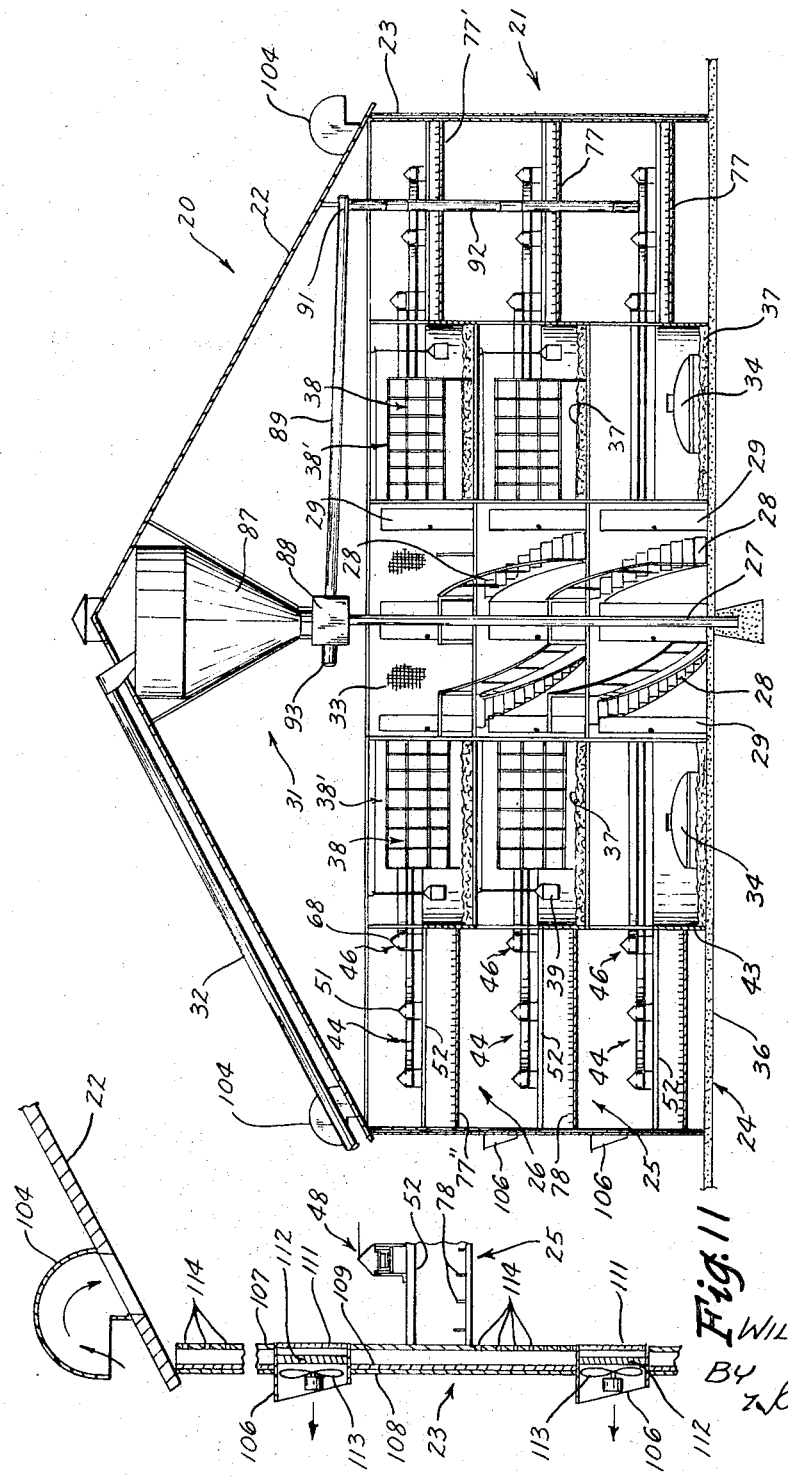

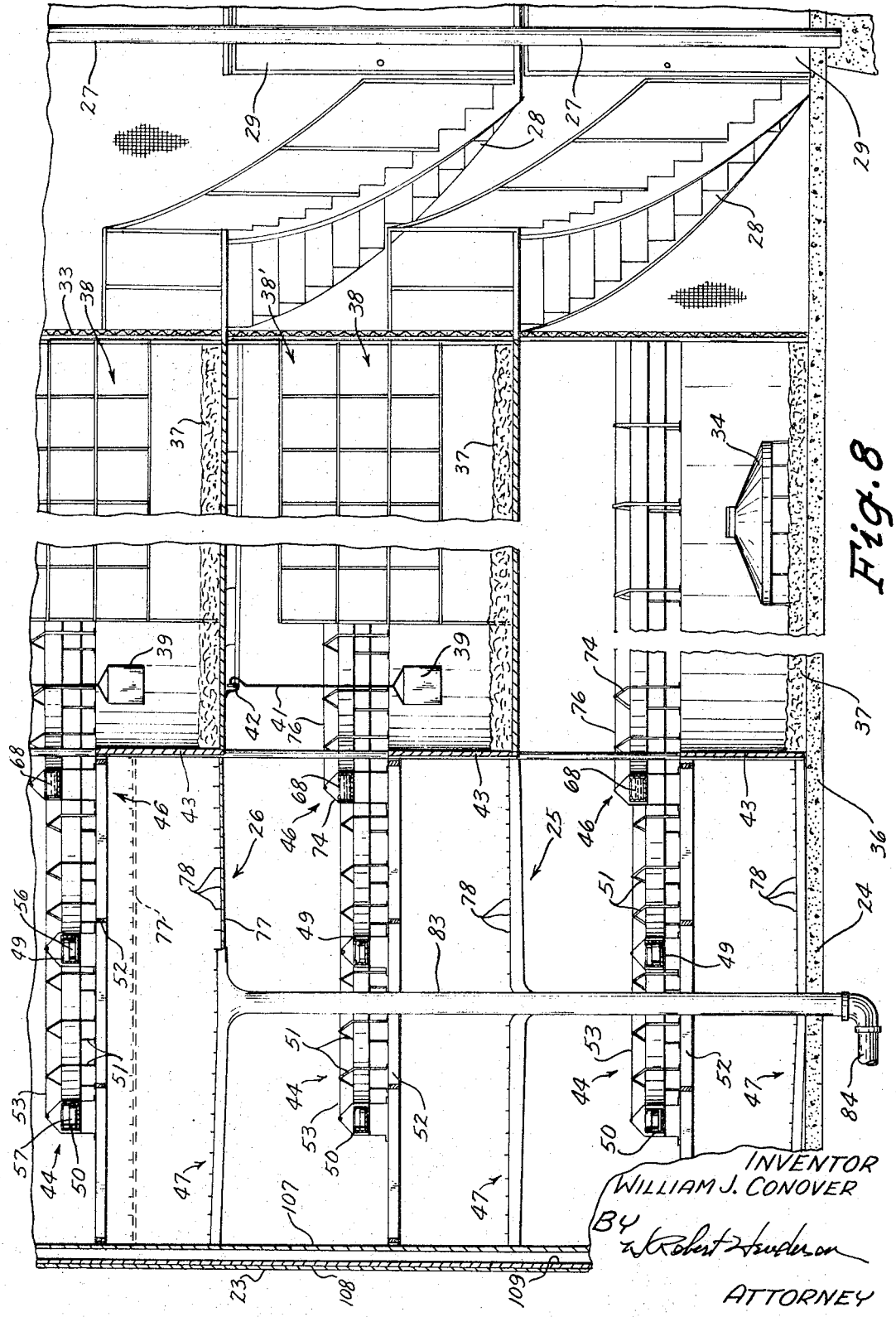

Feb. 13, 1968  W. J. CONOVER  3,368,527
POULTRY RAISING AND LAYING HOUSE
Filed April 11, 1966  5 Sheets-Sheet 5
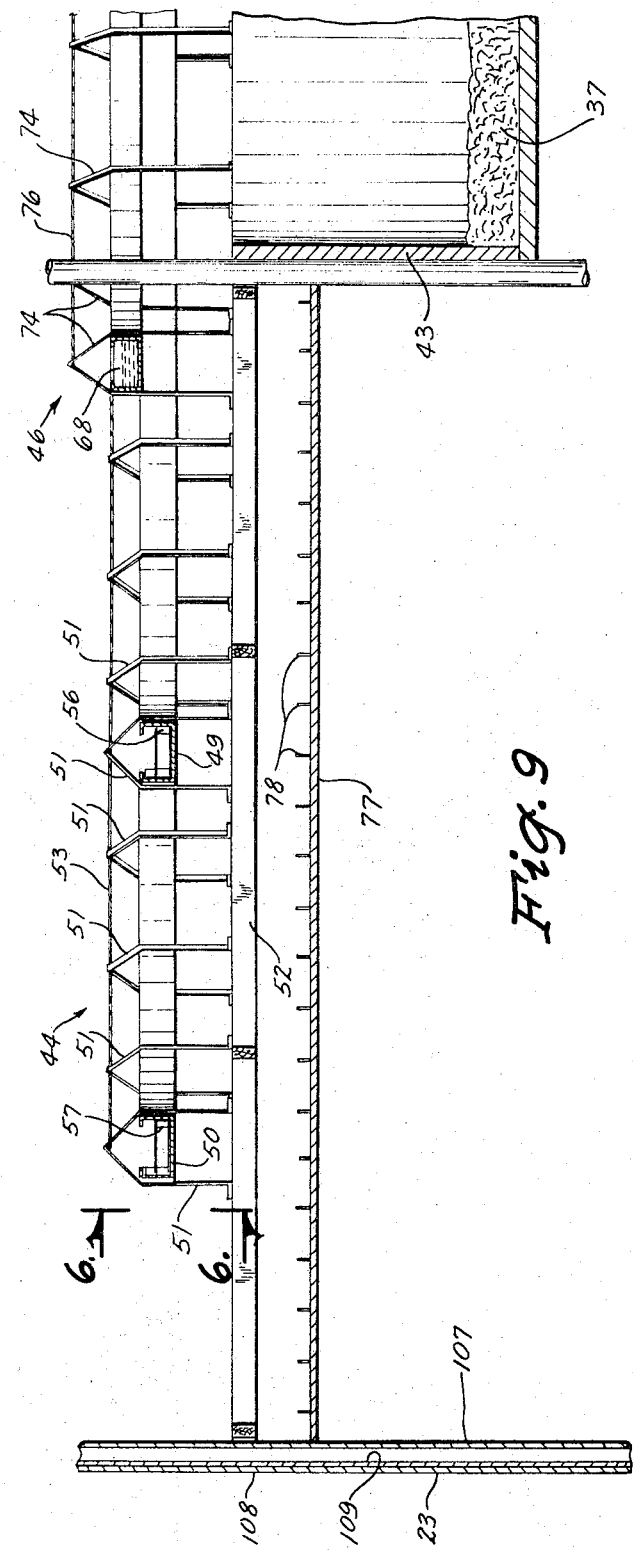
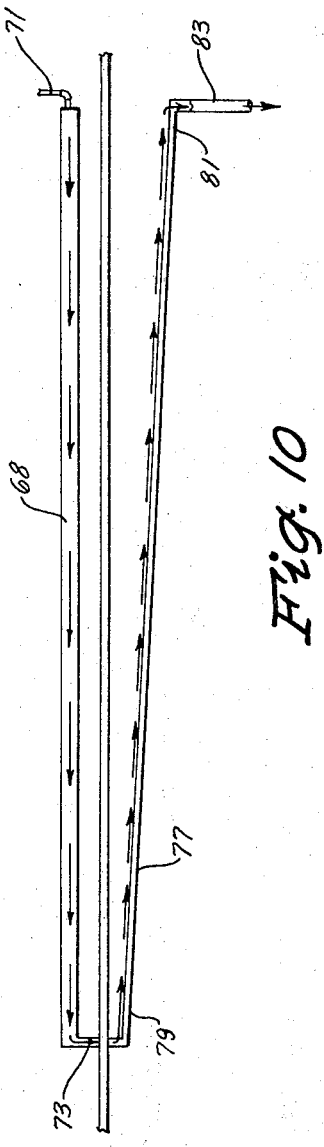
INVENTOR
WILLIAM J. CONOVER
BY
Robert Henderson
ATTORNEY United States Patent Office 3,368,527
Patented Feb. 13, 1968

1

3,368,527
POULTRY RAISING AND LAYING HOUSE
William J. Conover, Rhodes, Iowa, assignor to Black, Sivalls & Bryson, Inc., Kansas City, Mo., a corporation of Delaware
Filed Apr. 11, 1966, Ser. No. 541,634
7 Claims. (Cl. 119—18)

This invention relates generally to a poultry building, and particularly to a poultry raising and laying house.

It is an object of this invention to provide a new and novel poultry raising and laying house.

It is another object of this invention to provide such a poultry house of the most efficient construction, and which construction provides for the most efficient handling of the feeding, watering, and cleaning operations of the raising of the poultry.

Yet another object of this invention is the provision of a circular poultry house or bin having a plurality of floors, on each floor of which is provided automatic feeding, watering, and droppings disposal mechanisms, and also on each floor of which is provided either a plurality of hovers or nests for loose housing of hens.

Still another object of this invention is to provide a poultry raising and laying house wherein the entire process of feeding and watering the poultry, and of disposing of the droppings is automated.

Still another object of this invention is to provide a complete raising and egg laying unit for poultry of all ages, providing the most economical, practical and easily maintained structure, specifically a circular bin, which requires no more land or space than a conventional rectangular structure, and which ensures the basis for profitable poultry raising and egg production, utilizing loose housing techniques.

Another object of this invention is the provision of a poultry raising and laying house wherein efficient and effective ventilation is provided during all seasons.

Yet another object of this invention is the provision of a poultry raising and laying house wherein a plurality of housing floors are each supplied by a common feeding system and by a common droppings disposal system.

It is another object of this invention to provide a poultry raising and laying house wherein constant and continual dissolution and removal of the droppings is maintained.

Another object of this invention is the provision of a housing arrangement for poultry, comprising a plurality of floors of nests, feeding and watering areas easily accessible by the operator for profitable poultry raising and egg raising.

Yet another object of this invention is the provision of such a house as described hereinbefore, which is practical, economical, and effective.

These objects, and other features and advantages of this invention will become readily apparent upon reference to the following description, when taken in conjunction with the accompanying drawings, wherein:

FIG. 1 is a horizontal, sectional view in plan of the first floor of the poultry raising and laying house of this invention;

FIG. 2 is an enlarged, fragmentary view as taken along the line 2—2 in FIG. 1;

FIG. 3 is an enlarged, fragmentary view of the feed distributing chain of the invention;

FIG. 4 is a horizontal, sectional view in plan, by virtue of a broken line, of the second and third floors of the house;

FIG. 5 is an enlarged, fragmentary, sectional view showing a feed distributing device in full lines for the second and third floors, and in dotted lines for the first floor;

FIG. 6 is an enlarged, fragmentary view taken along the line 6—6 in FIG. 9, with certain parts broken away and others shown in sectional for clarity of illustration;

FIG. 7 is a sectional view as taken along the line 7—7 in FIG. 4;

FIG. 8 is an enlarged, fragmentary sectional view as taken along the line 8—8 in FIG. 1;

FIG. 9 is an enlarged, fragmentary sectional view as taken along the line 9—9 in FIG. 4;

FIG. 10 is a schematic view of the droppings removal system of the invention; and FIG. 11 is an enlarged, fragmentary sectional view of a wall of the house.

Referring now to the drawings, the poultry raising and laying house of this invention is indicated generally at 20 in FIG. 7, and comprises basically a circular bin 21 having a roof 22 mounted upon a circular, upstanding wall 23 enclosing one or more poultry housing floors, in this instance three floors indicated generally at 24, 25 and 26 respectively.

The house comprises additionally, a central access area, arranged concentrically about a center post 27, for all three floors, and within which is arranged a plurality of staircases 28 for ingress and egress to and from the respective floors via doors 29. Further included is a feed supply unit indicated generally at 31 in FIG. 7, and adapted to receive feed from an elevator 32 supported outside the bin for discharging feed through the roof 22 and into the unit 31.

Each floor 24, 25, and 26 includes generally an annular portion or section extending radially outwardly from a mesh or the like upstanding, circular inner wall 33 (FIG. 8) to the outer wall 23, each portion divided radially into a pair of inner and outer concentric areas. Referring to FIG. 7, the inner area of the first floor 24 includes a plurality of brooders 34 for chicks mounted on the concrete floor 36 of the house 20, and surrounded by a layer of broken and ground corn cobs, or the like, indicated generally at 37. Adequate heating is provided within the brooders 34 by conventional means.

Both the second and third floors 25 and 26 (FIG. 8) include about their inner portions a plurality of annularly arranged and vertically stacked nests 38 for pullets. Each annular row of nests 38 is spaced above the floor surface of the particular floor 24 and 25, and with the upper row 38' (FIG. 7) of the nests spaced below the floor or like superstructure thereabove.

For the purpose of easily gathering eggs laid in the nests 38, an egg case 39 (FIG. 8) is suspended by a hooked rod 41 from an annular track 42 mounted about the upper portion of each floor 24 and 25, such that the egg case 39 is movable about the track and adjacent to the rows of nests 38 as best illustrated in FIG. 8. It will be noted that each inner area of all three floors 24–26 is separated from the outer area by an upright partition 43 (FIG. 8) which extends upwardly approximately one-half the height of the floor. As with the inner area of the first floor 24, broken and ground corn cobs 37 are spread on the floor surface of both second and third floors 25 and 26 about the inner areas thereof.

Each outer area of all three floors 24–26 comprises the same structure for feeding, watering, and disposing of the droppings for the poultry. Therefore, the structure for but one floor will be described with like parts on the other floors illustrated by like reference numerals.

Generally speaking, the structure comprises a feeding unit 44 (FIG. 8), a watering unit 46, and a droppings disposal unit 47, the latter unit operatively connected to the watering unit 46 for utilization of the water therefrom as described hereinafter. The feeding unit includes an annular, continuous trough, indicated generally at 48 in FIG. 4, and which trough includes an inner section 49 and an outer section 50, the ends of which are interconnected so as to form the continuous feed trough. The U-shaped trough 48 is supported by a plurality of inverted, V-shaped upright supports 51 (FIG. 9) arranged annularly and concentrically about and supported upon a slatted sub-floor 52. The sub-floor 52 is such as to permit the poultry to walk thereover, but with their droppings falling therethrough to be deposited onto the droppings disposal unit structure 47 therebelow. A wire 53 is strung in a horizontally extended manner about the upper portions of the supports 51 to prevent the poultry from standing or roosting on top of the feed trough 48.

To distribute the feed, received in the trough 48 from the supply unit 31 (FIG. 7), whereby the feed is distributed evenly throughout the trough 48, a continuous, flexible, link chain 54 (FIGS. 3, 5, and 6) is provided. The feed distributing chain 54 is comprised of an inner section 56 (FIG. 3) and an outer section 57, the sections being interconnected by a plurality of struts 58. It will be noted that whereas the outer section 57 is one spacer high, for example, the inner section 56 is two spacers high for the purpose of enabling the upper portion of the inner section 56 to be engaged and thereby driven by a drive sprocket 59 (FIGS. 1 and 2). The drive sprocket 59 and idler sprocket 61 are located as best illustrated in FIGS. 1 and 4 for driving the chain 54 on each floor.

Rotation of the drive sprocket 59 (FIG. 2) is derived from a motor 62 and gear box 63 mounted on each floor for transmitting drive therefrom through an output shaft 64 and bearing mounting 66 to the drive sprocket 59. Thus, drive is imparted to the chain 54 via the upper portion of the inner section 56, and whereby both inner and outer sections 56 and 57 of the chain have link portions which are dragged along the bottom 67 (FIGS. 2 and 6) of the annular trough 48 to evenly distribute the feed thereabout.

The watering unit 46 (FIG. 8), similar to the feeding unit 44, includes a U-shaped annular trough 68 spaced radially inwardly of the feed trough 48, and one end 69 (FIG. 4) of which receives water from a source 71 (FIG. 10), with the other end 72 (FIG. 4) disposed over a lateral trough 73 extended outwardly toward the outer wall 23 of the bin. The water trough 68 is also supported above the slatted sub-floor 52 by a plurality of upright supports 74, and with another wire 76 strung thereabout to keep the poultry from standing or roosting on top of the water trough 68.

The droppings disposal unit 47 includes a substantially horizontally disposed, flat, annular board or pan 77 (FIG. 8) extended between the outer wall 23 and the partition 43, and upon which is formed a plurality of transversely spaced, upright strips 78. Referring to FIG. 4, one end 79 of the pan 77 is disposed below the overflow trough 73 of the water trough 68, to receive water therefrom, with the remainder of the pan depending therefrom in a spiral manner about the outer area of the floor (see the diametrically opposed pan sections 77′ and 77″ of FIG. 7 as to their difference in elevation) until the lower pan end 81 (FIG. 1) ends at a location adjacent the alleyway 86 for the house 20.

At this location, another lateral trough 82 not seen in FIG. 4 as its extends below the slatted sub-floor 52, is provided for draining the water and droppings removed thereby to a drain pipe 83 (FIG. 8) fluidly connected at its bottom through the house floor 36 to a septic tank conduit 84. Referring to FIG. 8, an illustration liberty has been taken in that the beginning of the pan 77 for the floor 26 is illustrated in dotted lines, with the lower end shown in full lines, dramatizing the change in height for the approximate 360° spiral drop.

The arrangement is such, that upon water from the watering trough 68 flowing into and over its lateral trough 73 (FIG. 4), water falling onto the upper end 79 of the pan 77 is distributed completely transversely across the entire dropping pan 77 by virtue of the strips 78, and whereupon the water runs downwardly therealong picking up the droppings and continually keeping moist and dissolving same as it travels toward the lower end 81 of the dropping pan 77. By this means, the droppings are continually dissolved and removed automatically due to a continual flow of water thereover. Referring to FIG. 10, a schematic representation of the flow of the water through the water trough 68, the lateral 73 thereof, and downwardly over the droppings pan 77 to the drain pipe 83 clearly shows the simultaneous movement of water for both feeding purposes and dropping removal purposes.

The feed supply unit 31 (FIG. 7) mentioned hereinbefore, provided for the purpose of automatically supplying feed from the elevator 32 to the feed trough 48, comprises a hopper 87 supported upon the centerpost 27, and an input feed housing 88 through which an auger tube unit 89 of conventional construction extends outwardly to its outer end 91 (FIG. 7) for discharging feed downwardly into a gravity feed tube 92 (see also FIGS. 4 and 5). A motor 93 (FIG. 7) is provided for rotating the auger (not shown) within the tube unit 89.

Feed being dropped through the tube 92 is discharged at each floor by means of a pair of oppositely, downwardly directed spouts 94 and 95 (FIG. 5), the lower ends of which are placed directly over the curved ends 96 and 97 of the feed trough 48 (FIG. 4). On the lower floor 24, the spouts 94 and 95 extend upwardly to a location above the bottom end 90 of the tube 92, as shown by dotted lines in FIG. 5, to provide ample height through the alleyway 86.

To ensure that feed is automatically supplied to the feed trough 48 at all times, at least one feed leveler switch 98 (FIG. 6) is provided for indicating whether or not, and if desired, how much feed is present within the feed trough 48. It will be remembered, that operation of the link chain 54 is such as to provide a substantially level amount of feed throughout the trough 48. Should the feed fall below a certain level, the switch 98 is energized. Each feed level switch 98 is electrically connected to a solenoid device 99 (FIG. 5) mounted on each spout 95 and 96 (only one device 99 showing) for controlling the position of a baffle 101 mounted within each spout and at the opening 102 thereof leading to the feed tube 92.

By this arrangement, although the feed leveler switch 98 of one floor may be calling for feed, and effect an opening of the baffles 101 for its particular spouts 94 and 95, the spouts for the other floors would remain closed, as shown by the dotted line position of the baffle 101 in FIG. 5, such that feed within the feed tube 92 is not permitted to pass through the spouts 94 and 95 of the floor which is not calling for feed. The electrical circuitry, which includes the motor 93 for operating the auger tube unit 89, the feed leveler switches 98, and the solenoid devices 99 is believed sufficiently simple that its illustration is not necessary herein. Such circuitry would definitely include a switch (not shown) at the outer end 91 of the auger tube unit 89 and connected to the motor 93 for ensuring that the feed tube 92 is always filled with feed.

For ventillation purposes, a plurality of conventional roof ventilators 104 (FIGS. 7 and 11) are provided, in addition to a plurality of wall ventilators 106. The house wall 23 comprises a pair of laterally spaced inner and outer panels 107 and 108 (FIG. 11), with an air gap therebetween, and with a layer of insulation 109 being placed against the outer wall panel 108.

Formed about each floor, approximately one-third up from the bottom thereof, the wall ventilators 106 are provided, and which include a plastic pane 111, or other transparent material, placed in an opening provided therefor in the inner wall panel 107, and with a commercial-type louver section 112 provided in the outer wall panel 108 opposite the pane 111. A fan 113 is placed in conjunction with the louvers 112 for effecting removal of air from within the house 20. In addition to this arrangement, the inner wall panel 107 between each pane 111 and the floor thereabove has a plurality of openings 114 formed therein, the size of which openings 114 becomes progressively larger from the pane 111 to the floor thereabove.

In summation, a poultry raising and laying house has been described hereinbefore which eliminates unclean and shoddy poultry structures, which eliminates the need for hand or other non-automatic cleaning mechanisms, and which provides an economical, clean, well ventilated and easily operated house for starting and/or profitably raising chicks and pullets.

Although a preferred embodiment of this invention has been described hereinbefore, it is to be remembered that various modifications and alternate constructions can be made thereto without departing from the true spirit and scope of the invention as defined in the appended claims. For example, although staircases are illustrated for movement to and from the upper floors, an elevator the floor of which extends completely across the open central area could be provided.

I claim:

1. A poultry raising and laying house comprising:
   a bin having a roof and a substantially circular upstanding wall enclosing at least one floor;
   an annular section of each said floor spaced from and concentric with the center of the bin;
   annular feed trough means mounted adjacent each said floor section;
   means for automatically supplying feed to said trough means;
   means movable about said trough means for distributing feed thereabout;
   annular watering means mounted adjacent each said floor section; and
   means disposed about each said floor section and below said trough means and said watering means for receiving poultry droppings, and operably connected to and receiving water from said watering means for fluidly removing the droppings therefrom.

2. A poultry raising and laying house as defined in claim 1, and further wherein said trough means includes a continuous trough, and said movable means includes a flexible member movable within said trough.

3. A poultry raising and laying house as defined in claim 1, and further wherein said feed supplying means includes an overhead hopper, a tubular auger device for transmitting feed from said hopper to a position over said trough means, means for gravitationally transmitting feed from said auger device downwardly toward each said floor section, and means responsive to the quantity of feed in said trough means for operatively controlling said gravitational feed transmitting means.

4. A poultry raising and laying house as defined in claim 1, and further wherein said movable means includes a continuous, flexible member movable within said trough means and operable to drag the feed therethrough.

5. A poultry raising and laying house as defined in claim 1, and further wherein said watering means includes an annular watering trough mounted adjacent said each floor section, said trough having an overflow device at one end thereof.

6. A poultry raising and laying house as defined in claim 5, and further wherein said flushing means includes a progressively downwardly spiraling pan the upper end of which is disposed below said overflow device, said pan adapted to receive droppings from thereabove, and having a plurality of upstanding, radially spaced strips mounted thereon and extended longitudinally in parallel relation thereon, said strips adapted to hold and retain the water flowing thereover against radial movement thereon, said flushing means including further a fluid drain device at the lower end of said pan.

7. A poultry raising and laying house as defined in claim 6, and further wherein said bin encloses at least a pair of said floors, one floor of which has mounted within the central portion thereof inwardly of said annular floor section a plurality of brooder means, and the other floor of which has mounted within a portion centrally of said annular section a plurality of poultry nests.

References Cited

UNITED STATES PATENTS

| | | | |
|---|---|---|---|
| 2,019,041 | 10/1935 | Bayley | 119—18 |
| 2,041,049 | 5/1936 | Crawford | 119—17 |
| 2,693,169 | 11/1954 | Otis | 119—18 |
| 2,701,547 | 2/1955 | Shaw | 119—22 |
| 2,735,400 | 2/1956 | Stubbs | 119—18 |
| 2,969,040 | 1/1961 | Siptrott | 119—18 X |
| 2,987,038 | 6/1961 | Cole | 119—18 |
| 3,101,070 | 8/1963 | Cordis | 119—52 |

ALDRICH F. MEDBERY, *Primary Examiner.*